US008970425B2

(12) United States Patent
Nogueira-Nine (10) Patent No.: US 8,970,425 B2
(45) Date of Patent: Mar. 3, 2015

(54) RADAR APPARATUS AND METHOD

(75) Inventor: Juan Nogueira-Nine, Stuttgart (DE)

(73) Assignee: Sony Corporation, Tokyo (JP)

( * ) Notice: Subject to any disclaimer, the term of this patent is extended or adjusted under 35 U.S.C. 154(b) by 341 days.

(21) Appl. No.: 13/486,317

(22) Filed: Jun. 1, 2012

(65) Prior Publication Data

US 2012/0313810 A1 Dec. 13, 2012

(30) Foreign Application Priority Data

Jun. 9, 2011 (EP) .................................. 11169360

(51) Int. Cl.
*G01S 13/08* (2006.01)

(52) U.S. Cl.
USPC ........................................................ 342/128

(58) Field of Classification Search
USPC ........................................................ 342/128
See application file for complete search history.

(56) References Cited

U.S. PATENT DOCUMENTS

| | | | |
|---|---|---|---|
| 2007/0025562 A1* | 2/2007 | Zalewski et al. ................ | 381/92 |
| 2009/0222226 A1 | 9/2009 | Baraniuk et al. | |
| 2010/0001901 A1* | 1/2010 | Baraniuk et al. ............. | 342/25 F |
| 2010/0265799 A1 | 10/2010 | Cevher et al. | |
| 2011/0080316 A1 | 4/2011 | Erkocevic-Pribic et al. | |

FOREIGN PATENT DOCUMENTS

WO 2011/004378 A1 1/2011

OTHER PUBLICATIONS

Graham M. Brooker, "Understanding Millimetre Wave FMCW Radars", 1st International Conference on Sensing Technology, Nov. 21-23, 2005, pp. 152-157.
Jianping Xu, et al., "Compressive Sensing in Radar High Resolution Range Imaging", Journal of Computational Information Systems, vol. 7, No. 3, Mar. 2011, pp. 778-785.
Peng Wang, et al., "FMCW Radar Imaging with Multi-Channel Antenna Array via Sparse Recovery Technique", 2010 International Conference on Electrical and Control Engineering, Jun. 25-27, 2010, pp. 1018-1021.
Matthew A. Herman, et al., "High-Resolution Radar via Compressed Sensing", IEEE Transactions on Signal Processing, vol. 57, Issue 6, Jun. 2009, pp. 1-10.
Emre Ertin, "Frequency Diverse Waveforms for Compressive Radar Sensing", Waveform Diversity and Design Conference (WDD), Aug. 8-13, 2010, pp. 000216-000219.

(Continued)

*Primary Examiner* — Timothy A Brainard
(74) *Attorney, Agent, or Firm* — Oblon, McClelland, Maier & Neustadt, L.L.P.

(57) ABSTRACT

A radar apparatus for obtaining a higher range resolution than conventional radar apparatus without increasing the bandwidth comprises a transmitter antenna that transmits a frequency modulated transmit signal having a transmit bandwidth and a receiver antenna that receives a receive signal reflected from said scene in response to the transmission of said transmit signal. A mixer mixes said receive signal with said transmit signal to obtain a mixed receive signal, a sampling unit samples said mixed receive signal to obtain receive signal samples from a period of said receive signal, and a processor processes said receive signal samples by defining a measurement matrix and determines the positions of one or more targets of the scene by applying compressive sensing using said measurement matrix and said receive signal samples.

16 Claims, 7 Drawing Sheets

(56) References Cited

OTHER PUBLICATIONS

Emmanuel Canoes, et al., "Robust Uncertainty Principles: Exact Signal Reconstruction from Highly Incomplete Frequency Information", IEEE Transactions on Information Theory, vol. 52, 2006, pp. 1-41.
David L. Donoho, "Compressed Sensing", IEEE Transactions on Information Theory, vol. 52, No. 4, Apr. 2006, pp. 1289-1306.
Emmanuel J. Candes, et al., "An Introduction to Compressive Sampling", IEEE Signal Processing Magazine, Mar. 2008, pp. 21-30.
Marco F. Duarte, et al., "Single-Pixel Imaging via Compressive Sampling", IEEE Signal Processing Magazine, Mar. 2008, pp. 83-91.
Richard G. Baraniuk, "Compressive Sensing", IEEE Signal Processing Magazine, Jul. 2007, 4 pages.
Justin Romberg, Imaging via Compressive Sampling, IEEE Signal Processing Magazine, Mar. 2008, pp. 14-20.
Scott Shaobing Chen, et al., "Atomic Decomposition by Basis Pursuit", Siam J. Sci. Comput., vol. 20, 1999, pp. 1-29.
Kristen Michelle Cheman, "Optimization Techniques for Solving Basis Pursuit Problems", Ph.D Thesis, North Carolina State University, Mar. 29, 2006, 39 pages.
Emmanuel Candes, et al., "The Dantzig selector: statistical estimation when $p$ is much larger than $n$", Ann. Stat., vol. 35, 2007, pp. 1-37.
Erman Özdemir, "Super-Resolution Spectral Estimation Methods for Buried and Through-The-Wall Object Detection", Master Thesis, Boğaziçi University, 2008, 237 pages.
Zoran A. Marićević, et al., "Time-Domain Measurements with the Hewlett-Packard Network Analyzer HP 8510 Using the Matrix Pencil Method", IEEE Transactions on Microwave Theory and Techniques, vol. 39, No. 3, Mar. 1991, pp. 538-547.
U.S. Appl. No. 14/056,045, filed Oct. 17, 2013, Nogueira-Nine.

\* cited by examiner

RADAR APPARATUS AND METHOD

CROSS-REFERENCE TO RELATED APPLICATION

The present application claims the benefit of the earlier filing date of EP 11169360.2 filed in the European Patent Office on Jun. 9, 2011, the entire content of which application is incorporated herein by reference.

BACKGROUND

1. Field of the Disclosure

The present disclosure relates to a radar apparatus and a corresponding radar method. Further, the present disclosure relates to a processing apparatus and method for use in such a radar apparatus and method, respectively. Still further, the present disclosure relates to a computer program for implementing said processing method and to a computer readable non-transitory medium storing such a computer program.

2. Description of Related Art

The range resolution of frequency modulated continuous wave (FMCW) radar systems improves (gets finer) by increasing the bandwidth of the transmitted chirp. Conventionally, the information about the range of the targets is extracted with a Fast Fourier Transform (FFT) of the received sampled data. Although the FFT is computationally efficient, it provides poor range resolution. Moreover, this technique hardly achieves the theoretical range resolution.

Some signal processing techniques have been adopted to achieve super-resolved range profiles of targets compared with conventional Fourier transform for the same frequency bandwidth, although the computational complexity of such methods is much larger than the FFT. They are known as spectral estimation methods and are based upon the estimation of the density of power in narrow spectral bands (bins). There are two different types of methods: non-parametric and parametric. Non-parametric methods make no assumption on the data while parametric methods use an assumed model of the data and try to estimate the parameters in that model. Parametric methods outperform non-parametric methods if the data satisfies the assumed model/structure, i.e. model postulated on data is appropriate; otherwise, non-parametric methods provide better spectral estimates than parametric methods. Some of these non-parametric methods are the periodogram, the Blackman-Tuckey method, the Bartlett method or the Welch method as described in Erman Özedemir, "Super-resolution spectral estimation methods for buried and through-the-wall object detection", Master Thesis, Boğaziçi University, 2008. Among the parametric methods the Yule-Walker method, the least-square method, the Matrix Pencil method as described in Zoran A. Mariievi C., Tapan K. Sarkar, Yingbo Hua and Antonije R. DjordjeviC, "Time-Domain measurements with the Hewlett-Packard Network Analyzer HP 8510 Using the Matrix Pencil Method", IEEE transactions on microwave theory and techniques, vol. 39, no. 3, March 1991, the Estimation of Signal Parameters via Rotational Invariance Techniques (ESPRIT) or the Multiple Signal Classification (MUSIC) method as described in the above cited Master Thesis of Erman Özedemir.

Peng Wang et al., "FMCW Radar Imaging with Multi-channel Antenna Array via Sparse Recovery Technique", 2010 International Conference on Electrical and Control Engineering, 25-27 Jun. 2010, pp. 1018-1021 discloses a radar system composed of a single transmitter and M receiving channels. Radar echo signals are acquired to estimate the angle, range and velocity in a multiple moving target scenario. The described algorithm is based on sparse recovery technique by exploiting the sparseness of the targets in angle-range domain. It is shown in simulations for automotive scenario that the proposed algorithm yield better performance in terms of both imaging accuracy and multiple-target resolution compared with the methods of conventional beam forming and minimum variance (Capon) beam forming.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object of the present disclosure to provide a radar apparatus and method to enhance the range resolution without increasing the bandwidth which can be easily applied in an FMCW radar apparatus. It is a further object of the present disclosure to provide a corresponding processing device and method as well as a corresponding computer readable non-transitory medium storing a computer program.

According to an aspect of the present disclosure there is provided a radar apparatus comprising:
a transmitter antenna that transmits a frequency modulated transmit signal having a transmit bandwidth towards a scene potentially comprising two or more targets,
a receiver antenna that receives a receive signal reflected from said scene in response to the transmission of said transmit signal,
a mixer that mixes said receive signal with said transmit signal to obtain a mixed receive signal,
a sampling unit that samples said mixed receive signal to obtain receive signal samples from a period of said receive signal, and
a processor that processes said receive signal samples by defining a measurement matrix assuming the receive signal were received in response to a frequency modulated transmit signal having an assumed bandwidth that is higher than said actual transmit bandwidth, said assumed bandwidth corresponding to a desired range resolution, and that determines the positions of one or more targets of the scene by applying compressive sensing using said measurement matrix and said receive signal samples.

According to a further aspect of the present disclosure there is provided a processor for use in a radar apparatus, in particular having a transmitter antenna that transmits a frequency modulated transmit signal having a transmit bandwidth towards a scene potentially comprising two or more targets, a receiver antenna that receives a receive signal reflected from said scene in response to the transmission of said transmit signal, and a mixer that mixes said receive signal with said transmit signal to obtain a mixed receive signal, and a sampling unit that samples said mixed receive signal to obtain receive signal samples from a period of said receive signal,
wherein said processor is configured to process said receive signal samples by defining a measurement matrix assuming the receive signal were received in response to a frequency modulated transmit signal having an assumed bandwidth that is higher than said actual transmit bandwidth, said assumed bandwidth corresponding to a desired range resolution, and to determine the positions of one or more targets of the scene by applying compressive sensing using said measurement matrix and said receive signal sample.

According to still further aspects corresponding methods and a computer readable non-transitory medium having instructions stored thereon which, when carried out on a computer, cause the computer to perform the steps of the processing method according to the present disclosure are provided.

Preferred embodiments of the disclosure are defined in the dependent claims. It shall be understood that the claimed processor, the claimed methods and the claimed computer readable medium have similar and/or identical preferred embodiments as the claimed radar apparatus and as defined in the dependent claims.

The present disclosure is based on the idea to enhance the range resolution in a radar apparatus using the principle of FMCW by means of the introduction of the paradigm of compressive sensing. If the condition of sparsity is fulfilled, the proposed solution is able to discriminate between targets which are at least up to five times closer than the theoretical range resolution imposed by conventional frequency domain processing of FMCW beat frequency analysis. The proposed solution particularly builds a model of the receive signals and then tries to estimate the range profile of the targets by solving an l1-regularization convex problem.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
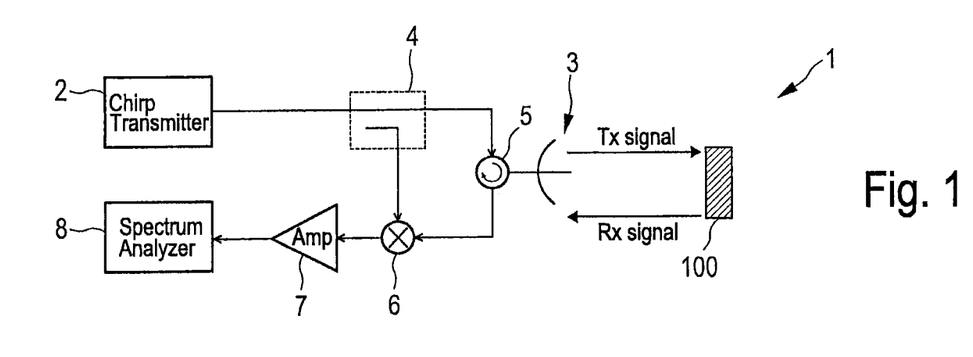
FIG. 1 shows an embodiment of a conventional FMCW radar apparatus.

Referring now to the drawings, wherein like reference numerals designate identical or corresponding parts throughout the several views, FIG. 1 shows an embodiment of a conventional FMCW radar apparatus 1. A thorough explanation of FMCW is given in G. Brooker, "Understanding Millimeter Wave FMCW Radars", 1st International Conference on Sensing Technology, Nov. 21-23, 2005, Palmerston North, New Zealand, p. 152-157. Such a FMCW radar 1 transmits a continuous wave signal that is frequency modulated (frequency is changing with time) to produce a chirp pulse by a chirp transmitter 2. This is transmitted to the object 100 (e.g. included in a scene) to be examined by a co-located (monostatic) antenna 3 and is also fed to the receiver via a coupler 4. Depending upon the properties of the object 100 the transmitted signal will be reflected by the object 100 and be received by the receiver of the FMCW radar, i.e. the co-located antenna 3. A duplexer or circulator 5 serves for time multiplexing the transmitting and receiving signals to/from the co-located antenna 3.

Since the transmitted chirp pulse is changing its frequency with time, the exact frequency received for a given time instant depends upon how far away the object is located and the corresponding flight time (Tp). This received signal is then mixed with the transmitted chirp (supplied to the mixer 6 via the coupler 4) and the output of the mixer 6 has a frequency which is the difference in frequency between the transmitted and received signal. This is known as the beat frequency ($f_b$) and is directly proportional to the distance between the FMCW radar and the object.

The beat frequency signal is converted from analog domain to digital domain by analog to digital converter (ADC) 7. The complex I/Q signal from the ADC 7 is then transformed to frequency domain by Fourier transform in a spectrum analyser or FFT transforming unit 8 to get each frequency bin. These frequency bins are directly related to the range of the target.

Figure 2:
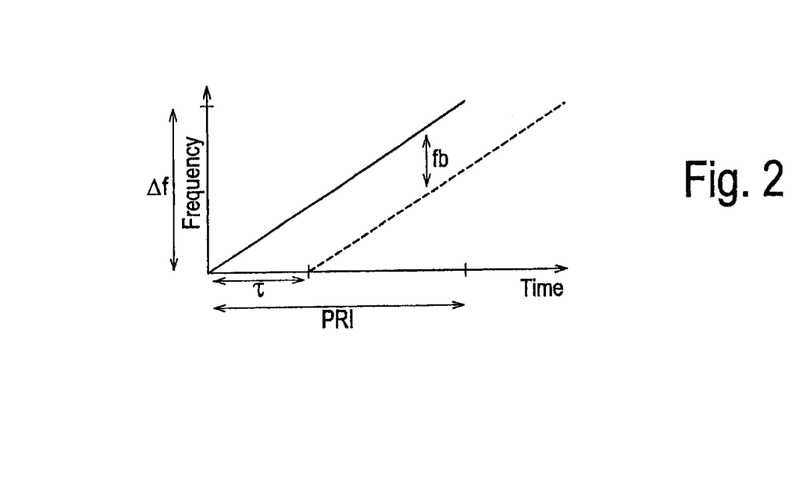
FIG. 2 shows a diagram of typical frequency against time waveforms for a conventional FMCW radar apparatus.

The frequency variation against time of the transmitter signal (chirp pulse) and the received signal are shown in FIG. 2 as solid and dotted lines respectively. The difference in frequency between the transmitted signal and the received, the beat frequency ($f_b$) is also labelled. As can be seen in FIG. 2, the frequency of the transmitted and received signal is varying with time. At each sampling point the frequency of the signal is generally known, and the bandwidth of the transmitted and received signal is limited for a given time instant. τ indicates the delay time between transmit and receive signal, PRI indicates the time period of one chirp signal, i.e. the pulse repetition interval.

The range resolution of frequency modulated continuous wave (FMCW) radar systems is inversely proportional to the bandwidth, i.e. it holds δR=c/(2 BW) wherein R is the range, c is the speed of light and BW is the bandwidth. This range information is conventionally extracted by performing frequency domain analysis (e.g. by a Fast Fourier Transform (FFT) of the received mixed signal (beat frequency)). With this method the presence of a target is shown by a main lobe with the maximum located at the frequency beat corresponding to the range of the target. When two or more targets are closer to each other than the maximum range resolution of the radar, this frequency based procedure is not able to distinguish among the main lobes corresponding to the different targets. This theoretical range resolution only depends of the bandwidth of the transmitted chirp, i.e. the higher the bandwidth, the better the range resolution.

As explained above several methods to increase the range resolution (also called super-resolution techniques) without increasing the bandwidth of the signal have been developed by means of intensive signal processing in the time domain.

The present disclosure proposes a new method to enhance the range resolution in a frequency-modulation based radar, such as a FMCW radar, by means of the introduction of the new paradigm of compressive sensing (CS). If the condition of sparsity is fulfilled, the method presented here is able to discriminate between targets which are up to five times closer than the theoretical range resolution imposed by frequency domain processing of the FMCW beat frequency analysis. Before details of the present disclosure are explained in more detail, the theory of CS shall be briefly explained.

The theory of CS basically states that a sparse signal x of length N in certain basis can be recovered exactly with high probability from only M measurements, where M<<N via l1-minimization. As a general rule, it has been found empirically, that if the signal x is K-sparse (only K of the N coefficients of x are non-zero), the number of needed measurements M is in the order of K*log N. Let $\Psi$ denote the basis matrix of the sparse signal (x=$\Psi$s), and let $\Phi$ denote a measurement matrix. The theory of CS demonstrates that it is possible to reconstruct the signal x from a small number o measurements y by solving the convex optimization problem:

$$\hat{s}=\min\|s\|_1 s.t. y=\Phi x=\Phi\Psi s=\Theta s \quad (1)$$

where s is a sparse vector with only K valid coefficients, and $\Phi$ is a M×N matrix with M<<N. Another condition that must be satisfied, besides the sparsity of the signal, is the restricted isometry property (RIP) that states that the reconstruction of the signal would be successful only if the matrix $\Theta$ satisfies:

$$1-\varepsilon \leq \frac{\|\Theta v\|_2}{\|v\|_2} \leq 1+\varepsilon \quad (2)$$

where v is an arbitrary sparse signal and $\varepsilon$>0. A related property, much easier to prove is known as the incoherence property which states that the lower the coherence between the representation matrix $\Psi$ and the measurement matrix $\Phi$ is, the higher would be the probability of a perfect reconstruction. The coherence $\mu$ is defined as:

$$\mu(\Phi, \Psi) = \sqrt{n} \cdot \max_{1 \leq k,j \leq n} |\langle \varphi_k, \psi_j \rangle| \quad (3)$$

In other words, the coherence measures the largest correlation between any two elements of $\Psi$ and $\Phi$. Detailed explanations of the theory of compressive sensing can, for instance, be found in E. Candes, J. Romberg, and T. Tao, "Robust uncertainty principles: Exact signal reconstruction from highly incomplete frequency information," IEEE Transactions on Information Theory, vol. 52, pp. 489-509, 2006, D. Donoho, "Compressed sensing," IEEE Transactions on Information Theory, vol. 52, pp. 1289-1306, 2006, or Emmanuel J. Candès and Michael B. Wakin, "An introduction to compressive sampling", IEEE Signal Processing Magazine, pp. 21-30, March 2008.

Conventionally, CS is utilized to reduce the number of necessary measurements with the aim to reduce the acquisition time while still keeping an acceptable quality of the recovered signal (image, sound, etc.), or to reduce the hardware complexity, (i.e. sampling the signal at lower rate to reduce the requirements of a digital-to-analog converter). The present disclosure, however, proposes to use CS in a completely different approach: instead of reducing the number of measurements to recover the original signal, according to the present disclosure all the available measurements are taken, and a signal with a better quality (in some sense) than the one recovered with the conventional method is reconstructed.

Figure 3:
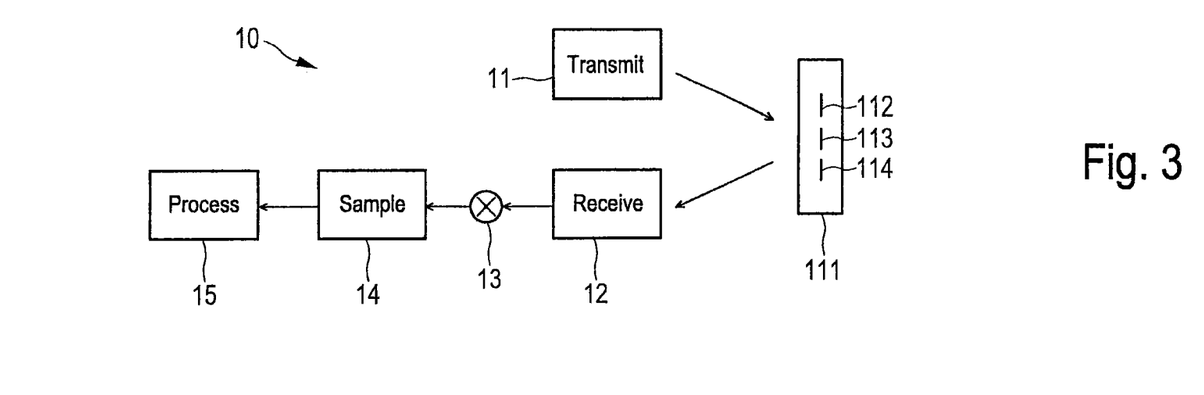
FIG. 3 shows an embodiment of a FMCW radar apparatus according to the present disclosure.

FIG. 3 shows a schematic diagram of the general layout of a radar apparatus 10 according to the present disclosure. It comprises a transmitter antenna 11 that transmits a frequency modulated transmit signal having a transmit bandwidth towards a scene 111 potentially comprising two or more targets 112, 113, 114 and a receiver antenna 12 that receives a receive signal reflected from said scene 111 in response to the transmission of said transmit signal. Further, the radar apparatus 10 comprises a mixer 13 that mixes said receive signal with said transmit signal to obtain a mixed receive signal and a sampling unit 14 that samples said mixed receive signal to obtain receive signal samples from a period of said receive signal. A processor 15 is provided that processes said receive signal samples by defining a measurement matrix assuming the receive signal were received in response to a frequency modulated transmit signal having an assumed bandwidth that is higher than said actual transmit bandwidth, said assumed bandwidth corresponding to a desired range resolution, and that determines the positions of one or more targets of the scene by applying compressive sensing using said measurement matrix and said receive signal samples.

In the embodiment of a FMCW radar, which shall be used herein for explaining the details of the present disclosure, CS is applied to all the data collected in the receiver to achieve a range resolution that is finer than the resolution obtained when the data is processed in a conventional manner. In contrast, the conventional method performs an analysis in the frequency domain by means of an FFT and the achieved resolution is close to the theoretical one.

Figure 4:
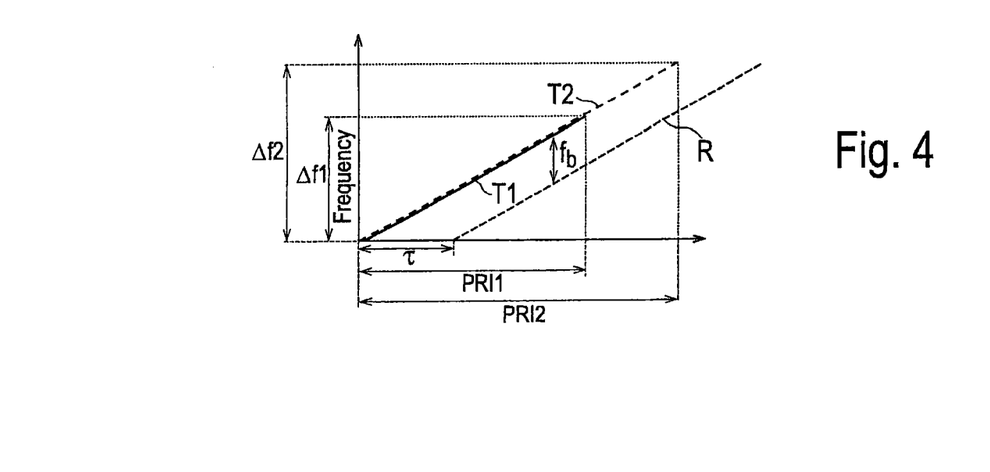
FIG. 4 shows a diagram of typical frequency against time waveforms for a FMCW radar apparatus according to the present disclosure.

As it was mentioned before, the range resolution in a FMCW radar depends only on the transmitted bandwidth. To improve the range resolution with the same bandwidth, it is considered that the collected data is just a reduced set of samples of an FMCW radar with larger bandwidth, which has a finer range resolution. This is illustrated in FIG. 4. Here, $\Delta$f1 indicates the transmit bandwidth of the actual transmit signal T1 transmitted by the transmitter antenna 12 and $\Delta$f2 indicates the larger (assumed) bandwidth of the assumed (extended) transmit signal T2 (shown as dashed line) that is theoretically considered for use in the CS algorithm for achieving a higher range resolution. The receive signal is indicated by R. The actual pulse repetition interval is indicated by PRI1. From this point of view, the theory of CS says that it would be possible to reconstruct the signal applying CS, and then extract the information it contains (i.e. the number of targets and their range).

First, a signal model is posed that is suitable to be used as the input for the compressive sensing algorithm. Although the transmitted signal is a continuous ramp frequency chirp (but could also be a stepped ramp signal, or other signal changing its frequency with time), once the reflected signal is sampled at the receiver, these receive signal samples are considered as a collection of pulses from a step frequency radar with frequencies corresponding to the sample points. To illustrate this the receive signal is sampled at the sampling frequency $f_s$ to obtain receive signal samples $y_k$ at intervals $kT_s$:

$$y_k = S_{ij}(kT_s) = s \cdot e^{j2\pi(f_c\tau + \alpha kT_s\tau - 1/2\alpha\tau^2)} \quad (4)$$

where $\alpha = \Delta f/PRI$ is the slope of the chirp and $\tau = 2R/c$ is the propagation time. During one period of the receive signal $N = PRI/T_s$ receive signal samples are taken. If there are M targets located at $R_m$ positions in the scene, equation (4) can be expanded into:

$$y_k \atop {k=1 \ldots N} = \sum_{m=1}^{M} s_m e^{j\frac{4\pi}{c}R_m\left(f_k - \frac{\alpha R_m}{c}\right)} \quad (5)$$

wherein $$f_k = f_c + \alpha k T_s = f_c + \frac{\Delta f}{N} k. \qquad (5')$$

For each target with a reflectivity $s_m$ at range $R_m$ the FMCW radar 10 receives N discrete frequencies $f_k$. The previous expression given in equation (5) can be rewritten using a matrix notation:

$$\begin{bmatrix} y_0 \\ y_1 \\ y_2 \\ \vdots \\ y_N \end{bmatrix} = e^{j\frac{4\pi}{c}} \begin{bmatrix} e^{jR_0(f_0 - \frac{\alpha R_0}{c})} & e^{jR_1(f_0 - \frac{\alpha R_1}{c})} & \cdots & e^{jR_{m-1}(f_0 - \frac{\alpha R_{m-1}}{c})} \\ e^{jR_0(f_1 - \frac{\alpha R_0}{c})} & e^{jR_1(f_1 - \frac{\alpha R_1}{c})} & \cdots & e^{jR_{M-1}(f_1 - \frac{\alpha R_{M-1}}{c})} \\ \vdots & \vdots & & \vdots \\ e^{jR_0(f_N - \frac{\alpha R_0}{c})} & e^{jR_1(f_N - \frac{\alpha R_1}{c})} & \cdots & e^{jR_{M-1}(f_N - \frac{\alpha R_{M-1}}{c})} \end{bmatrix} \begin{bmatrix} s_0 \\ s_1 \\ s_3 \\ \vdots \\ s_{M-1} \end{bmatrix} \qquad (6)$$

$$y = \Phi s$$

where the vector $s = [s_0, s_1, s_2, \ldots s_{M-1}]$ represents the reflectivity of the targets to be detected. The representation matrix $\Psi$ in this case is just a M×M identity matrix and therefore $\Theta = \Psi\Phi = \Phi$.

Obtaining s from y is an inverse problem with more unknowns than equations and therefore impossible to solve by traditional methods. Compressive sensing tries to solve such an inverse problem by looking for the sparsest vector s that best fits within this model, given the received signal y. Indeed, if the signal s is actually sparse in some domain, compressive sensing would be able to guess it with overwhelming probability by means of an l1-minimization algorithm. In an embodiment of the present disclosure it is assumed that the number of targets is limited and therefore sparse in the space domain, i.e. only some coefficients $s_i$ in the vector will be non-zero.

The next step is to define a discrete grid in the space consisting in M intervals with finer resolution than the theoretical radar range resolution. Empirically it has been found that a value of 5 to 10 times the radar range resolution gives good results.

Once the signal model is defined the l1-regularization problem (i.e. equation (1)) is to be solved to obtain a solution s consistent with the observations y. This is a convex optimization problem that can be conveniently reduced to a linear program and then solved via a Basic Pursuit as e.g. described in Chen, S. S., Donoho, D. L., Saunders, M. A, "Atomic decomposition by basis pursuit". SIAM J. Sci. Comput. 20 (1999), 33-61, or any other decomposition method as e.g. described in Kristen Michelle Cheman, "Optimization techniques for solving basis pursuit problems", PhD Thesis, North Carolina State University, March, 2006. However the results provided by these linear solvers degrade quickly in presence of noise and furthermore they are not computationally efficient. If the measurements y are corrupted by noise, the problem (1) is preferably reformulated to an alternative l1-minimization algorithm with unequally constrains:

$$\min\|s\|_1 \, s.t. \, \|\Phi x - y\|_2 \le \epsilon. \qquad (7)$$

The main difference with the problem in (1) is that the reconstruction now has to be only consistent with the noise level. This is still a convex problem but it has to be recanted as a second order cone problem and solved with a second order cone solver like for example SeDuMi or SDPT (these are well known software packages/matlab toolboxes to solve optimization problems over symmetric cones; this includes linear, quadratic, second order conic and semidefinite optimization, and any combination of these; they can, for instance, be found in the Internet or in matlab libraries, e.g. currently under the following links: sedumi.ie.lehigh.edu and www.math.nus.edu.sg/~mattohkc/sdpt3.html). A better estimator for noisy data than the general problem proposed in (9), that is also computationally tractable, is the Dantzing selector estimator as e.g. described in E. Candes and T. Tao, "The dantzig selector: Statistical estimation when p is much larger than n," Ann. Stat., vol. 35, pp. 2392-2404, 2007:

$$\min\|s\|_1 \, s.t. \, \|\Phi^H(\Phi s - y)\|_\infty \le \mu. \qquad (8)$$

The Dantzing selector is accurate, but it is very sensitive to the regularization value $\mu$. A wrong selection of this value may shrink the vector s too much and therefore underestimate the non-zero coordinates, which in the present case represent the radar targets that shall be estimated. Therefore, finding the optimal regularization factor is a crucial task.

Figure 5:
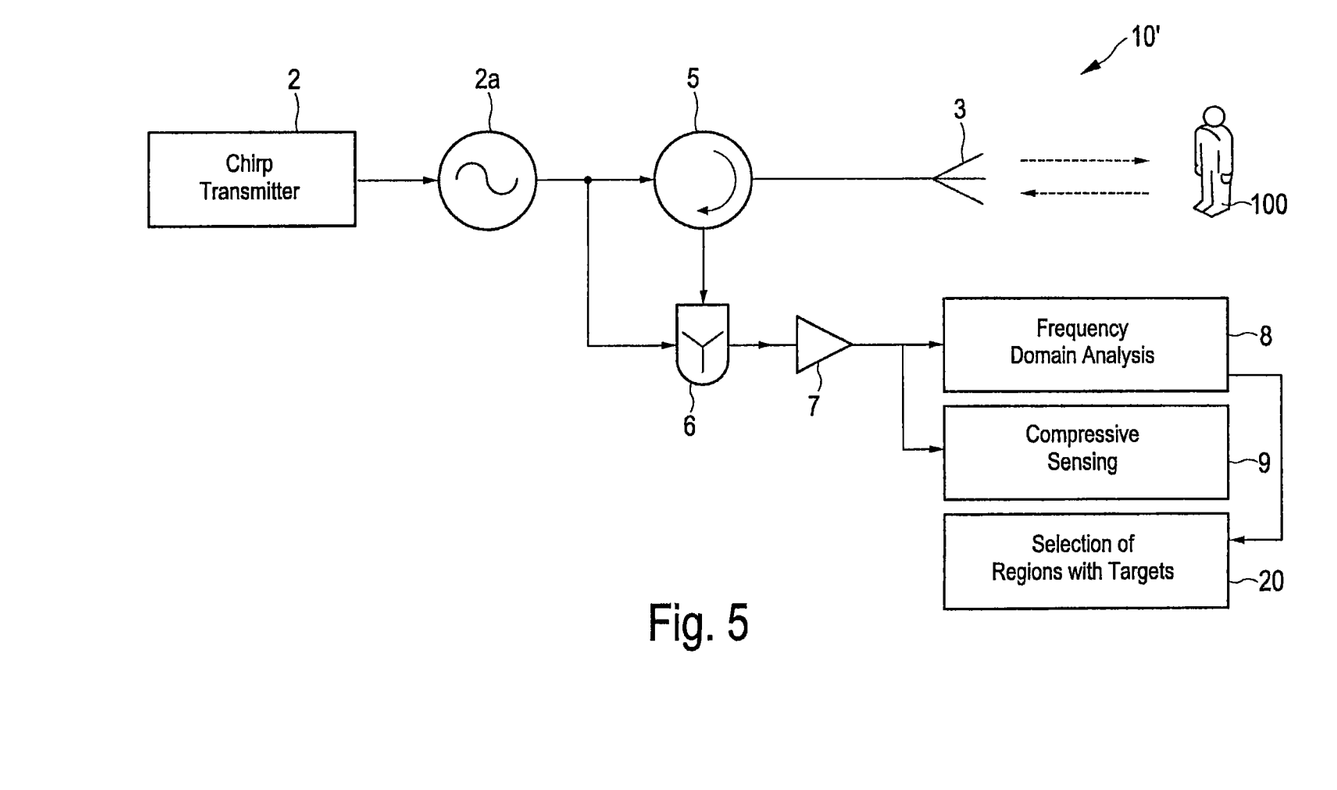
FIG. 5 shows another embodiment of a FMCW radar apparatus according to the present disclosure.

A more detailed embodiment of a radar apparatus 10' according to the present disclosure is schematically shown in FIG. 5. Here, for like elements the same reference numbers are used as in FIG. 1. Besides the VCO 2a in the transmitter path (which may also be provided in the conventional radar apparatus 1), an explicit compressive sensing unit 9 is provided according to the present disclosure for applying compressive sensing using said measurement matrix and said receive signal samples. Also in this embodiment a co-located antenna 3 is used. In other embodiments, however, separate transmitter and receiver antennas might be used. Further, more than one antenna might be used on the transmitter and/or the receiver side.

The FFT unit 8 may further be used to perform a FFT analysis of the mixed receive signal to obtain an FFT receive signal which may be fed to selection unit 20 that selects regions of the scene in which potential targets are located by analyzing said FFT values of the receive signal. The subsequent processing in the compressive sensing unit 9 is then in an advanced embodiment configured to process said receive signal samples and define a measurement matrix on a grid having a higher range resolution than the theoretical range resolution only for the selected regions and to determine the positions of one or more targets by applying compressive only within the selected regions of the scene.

Figure 6:
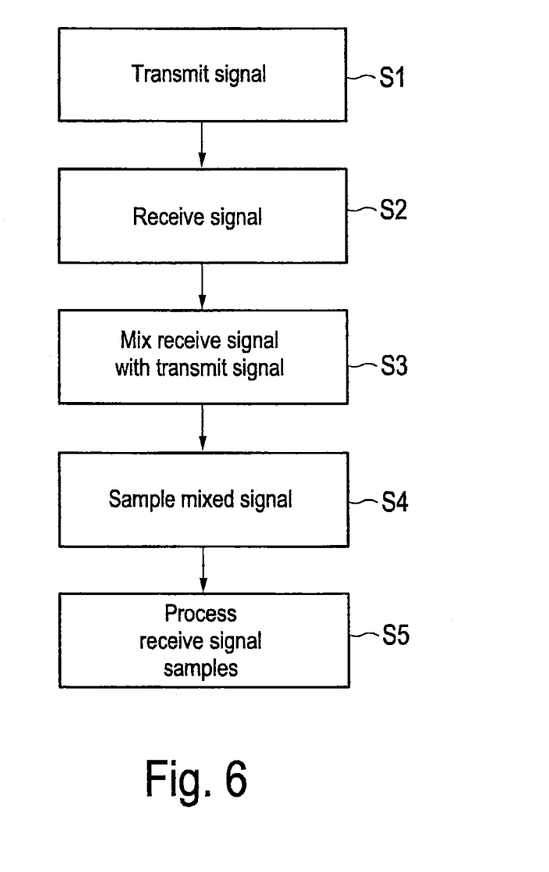
FIG. 6 shows a flow chart of an embodiment of a radar method according to the present disclosure.

FIG. 6 shows a flow chart of an embodiment of a radar method according to the present disclosure. It comprises the steps of transmitting (S1) a frequency modulated transmit signal having a transmit bandwidth towards a scene potentially comprising two or more targets, receiving (S2) a receive signal reflected from said scene in response to the transmission of said transmit signal, mixing (S3) said receive signal with said transmit signal to obtain a mixed receive signal, and sampling (S4) said mixed receive signal to obtain receive signal samples from a period of said receive signal, and processing (S5) said receive signal samples by defining a measurement matrix assuming the receive signal were received in response to a frequency modulated transmit signal having an assumed bandwidth that is higher than said actual transmit bandwidth, said assumed bandwidth corresponding to a desired range resolution, and by determining the positions of one or more targets of the scene by applying compressive sensing using said measurement matrix and said receive signal samples.

Figure 7:
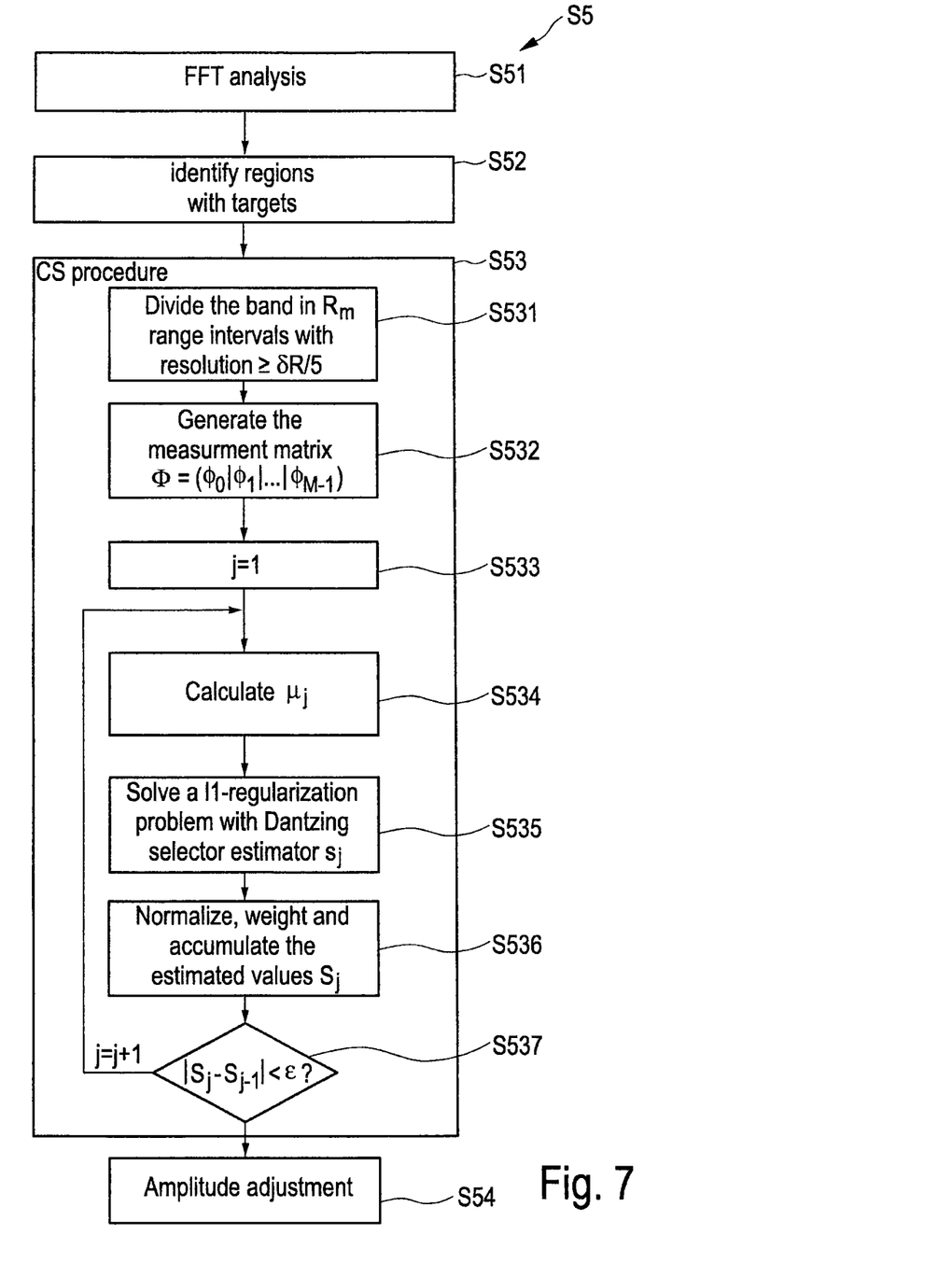
FIG. 7 shows a flow chart of an embodiment of a processing method according to the present disclosure.
Figure 8:
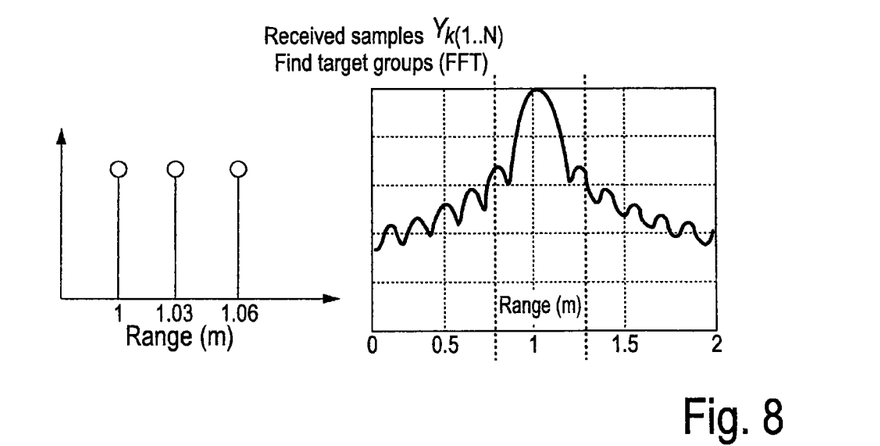
FIG. 8 shows diagrams illustrating three targets at different distances and a corresponding FFT signal.

In a preferred embodiment an iterative algorithm is used that adjusts, in each iteration, the regularization value and weights of the estimated coordinates. FIG. 7 shows a flow chart of a preferred embodiment of the step of processing S5 of a radar method according to the present disclosure using such an iterative algorithm. A scenario shall be assumed where the scene comprises three static targets with the same reflectivity located at distances of 1 m, 1.03 m and 1.06 m from the radar as illustrated in the diagrams shown in FIG. 8 depicting the three targets at the three different distances and an FFT signal thereof. The radar apparatus comprises, as mentioned above, a monostatic (i.e. one transmitter antenna and one co-located receiver antenna), e.g. an FMCW radar unit, with (as an example) an effective bandwidth of 1 GHz, which corresponds to a theoretical range resolution of 15 cm ($\delta R = c/2\,BW$). The radar transmitter sends a signal (one chirp) that beats the targets and it is reflected back to the receiver. The received signal is sampled to generate N samples $y_{K(1...N)}$.

Then, in a first (optional) processing step S51 the receive signal samples are pre-processed in a conventional manner in the frequency domain by means of a Fast Fourier Transform (FFT). This enables identifying the regions of the space where possible targets are located in processing step S52. Applying the compressive sensing procedure in processing step S53 to the complete radar is generally possible, but computational ineffective. With the FFT a fast view of the possible zones where two or more targets are present, but the conventional radar apparatus is not able to resolve them due to limited bandwidth.

In the CS processing step S53, each of the identified range bands is first divided in $R_m$ intervals with a resolution at least finer than a predetermined (e.g. fifth) part of the theoretical range resolution ($\delta R/5$) in step S531. In this way a grid is created in space where now the range resolution is limited by the size of the $R_m$ intervals. In reality the CS method cannot improve the range resolution indefinitely and it has been found empirically, that range resolution improvements better than 5 to 10 times the theoretical one are difficult to achieve. Dividing the range of interest in intervals with resolution beyond this practical limit ensures that the procedure will obtain the best resolvable resolution. In the above mentioned three targets example, the intervals are taken 0.5 cm long (i.e. $\delta R/30$).

Once the intervals have been defined, the measurement matrix $\Phi$ is created in step S532 out of the elements $\phi(k,m)$ for each frequency $f_k$ and each range $R_m$. Preferably, $\phi(k,m)$ are defined as $$\Phi(k, m) = e^{j\frac{4\pi}{c}R_m\left(f_k - \frac{\alpha R_m}{c}\right)}. \quad (9)$$

The following steps S533 to S537 are the components of the compressive sensing core of the procedure and are executed sequentially. In each iteration the outputs of the l1-regularization problem step are refined until a certain stop condition (e.g. an upper number of iterations, or a threshold for the improvement level) is satisfied.

After initializing parameter j to 1 in step S533, step S534 is to estimate the regularization value μ, which is defined in E. Candes and T. Tao, "The dantzig selector: Statistical estimation when p is much larger than n," Ann. Stat., vol. 35, pp. 2392-2404, 2007 like $$\mu = (1+t^{-1})\sqrt{2\log N\sigma^2}, \quad (10)$$

where $\sigma^2$ is the noise variance and t a positive scalar. Although there is no method to select the value for t, and hence for μ, it can be easily recognized that there is a lower bound when $t \to \infty$. Furthermore if the trivial solution described in equation (8) is considered, i.e. s=0, an upper bound is achieved for the regularization value:

$$\|\Phi^H y\|_\infty > \mu > \sqrt{2\log N\sigma^2}. \quad (11)$$

Preferably, a formula (equation (12) below) is defined that gives μ an initial value that it is close to the difference between the two bounds, and that decreases its value exponentially with each iteration. With the calculated value an l1-minimization problem is solved in step S535 using the Dantzing selector estimator described in equation (8). Following this procedure, with the first one or two iterations an estimation of the most powerful targets (which usually correspond to the top of the main lobe in the output of the FFT) is obtained.

$$\mu_j = \frac{\|\Phi^H y\|_\infty - \max_{i=0...M-1}\|\phi_i\|_\infty \sqrt{2 \cdot \log N\sigma^2}}{1.1 \cdot 2^{j-1}}. \quad (12)$$

In the next iterations, as the regularization value becomes smaller, less powerful targets, if some others are present, become visible. In the final stages, as μ comes close to the lower bound and therefore to the noise level, even less powerful targets may became visible, but also some inexistent targets appear. These spurious targets need to be handled accordingly to avoid them to create false positives.

For this a step S536 of normalizing, weighting and accumulating the estimated values is used in which the following formula is applied:

$$s_j = s_{j-1} + \frac{s_j}{\max(s)} \frac{j}{1.1 \cdot 2^{j-1}}. \quad (13)$$

This formula (13) penalizes these spurious targets and favors those which regularly appear in several or all iterations. After several iterations the regularization factor approximates to its lower limit and the differences between Dantzing estimators in two consecutive iterations is minimum. This is checked in step S537.

Figure 9:
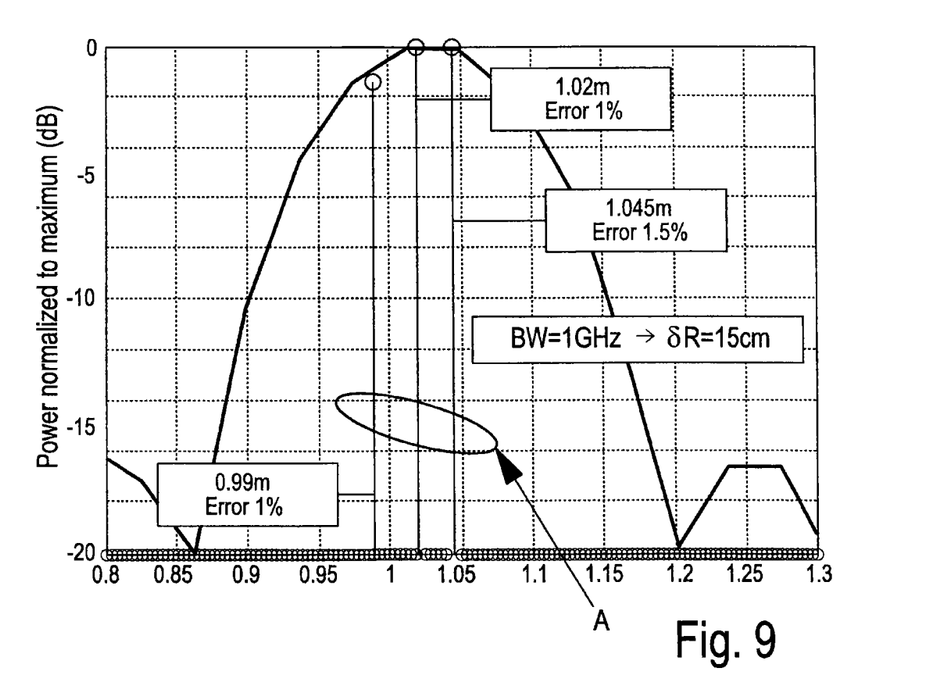
FIG. 9 shows a diagram illustrating the power normalized to a maximum over the normalized range for the three targets example obtained using simulation.

At this point the iterative process can be terminated and the results are then amplitude adjusted in step S54. This adjustment is preferred because the estimated values amplitudes depend on the value of μ and therefore are normalized during the iterative process. To correct the absolute values the spectrum calculated in step S532 are preferably used. This is also illustrated in FIG. 9 showing a diagram of the power normalized to a maximum over the normalized distance obtained by zooming-in the main lobe area indicated in the FFT chart of FIG. 8. The super-resolved targets (three in this case indicated by A in FIG. 9) after amplitude adjustment are also shown.

This example using three targets with the same RCS (radar cross section) located at 1 m, 1.03 m and 1.06 m respectively as shown in FIG. 8, has been simulated by a FMCW radar simulator with a bandwidth of 1 GHz that corresponds to a range resolution of 15 cm. The output of the proposed method is able to resolve the three targets with a separation of 3 cm among them as illustrated in FIG. 9, while the traditional frequency domain analysis based on a DFT/FFT is not able to provide such a range resolution. This corresponds to an improvement of 5 times in the range resolution. FIG. 9 indicates also for each target, the estimated range and the deviation (% error) with respect to the real value.

Figure 10A:
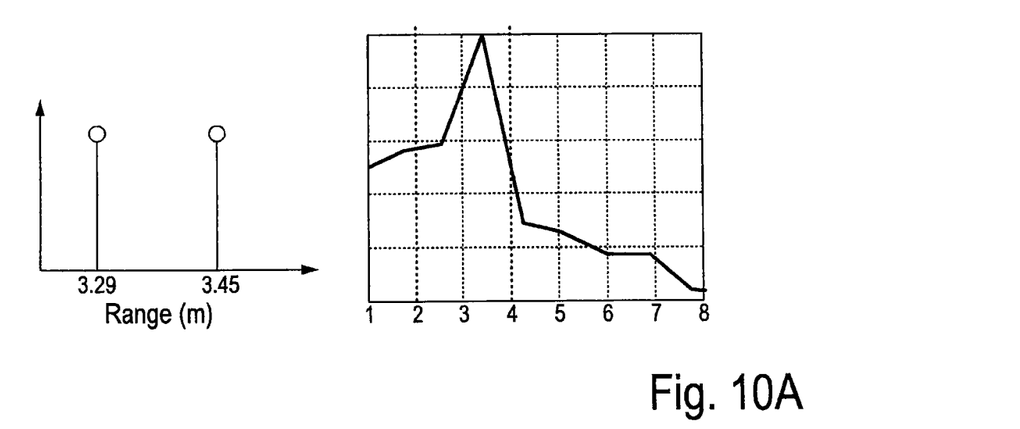
FIG. 10 shows diagrams illustrating the achievable range resolution obtained in a real experiment.
Figure 10B:
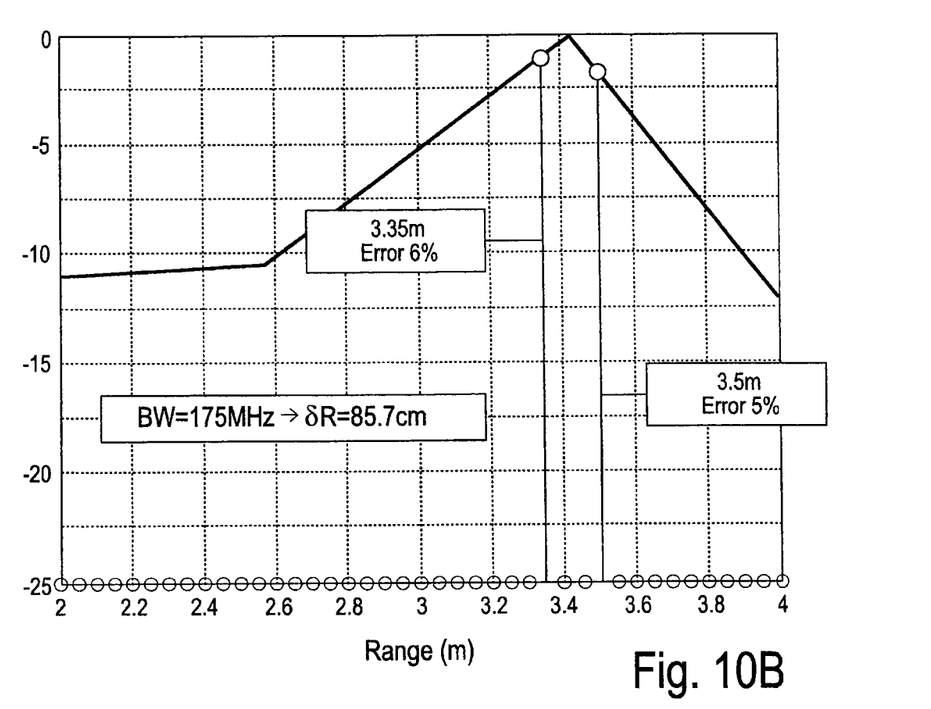

The validity of the proposed method has also been tested in a real scenario applying it to the measurements done with a FMCW radar working at 94 GHz with a bandwidth of 175 MHz, which corresponds to a range resolution of 85.7 cm. The tested scenario included two targets separated by 16 cm (3.29 m and 3.45 m from the radar). As it can be seen in FIG. 10A, also here the FFT analysis is unable to resolve the two targets but with the proposed method they can be clearly resolved as shown in FIG. 10B. This corresponds again to a range resolution improvement better than 5 times.

In the above optional iterative algorithm, the algorithm is preferably run for each region in which potential targets have been found independently to reduce the calculation amount and time. If the scanned region is very large and the defined grid very fine, the measurement matrix will be huge and difficult to process in reasonable time. Therefore is better to focus on restricted regions where it is already known in advance (e.g. from the FFT analysis or based on other prior knowledge, e.g. another measurement method) that some targets are present and define the fine grids only in those regions.

The data used are always the same, independently of the region. The measurement matrix is an element that determines if the received signal matches some target in this region. In other words, what the l1-norm minimization algorithm does is trying to match the received signal with an electromagnetic propagation model (represented by the measurement matrix) of a radar apparatus with certain range resolution. If the signal is sparse (in this case this means, that the number of real targets is much smaller than the number of grid points) the algorithm is able to find the solution that do this match, i.e. how many targets, how big and where they should be to produce the received signal if such a high range resolution system modelled within the measurement matrix would be actually available. The measurement matrix can generally be restricted to any desired region including the corresponding range grid points $R_m$ when building the measurement matrix as defined in equation (9). If there are no targets in this area the algorithm would not find any match and therefore no targets would be found.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

The invention claimed is:

1. A radar apparatus comprising:
a transmitter antenna that transmits a frequency modulated transmit signal having a transmit bandwidth towards a scene potentially comprising two or more targets;
a receiver antenna that receives a receive signal reflected from said scene in response to the transmission of said transmit signal;
a mixer that mixes said receive signal with said transmit signal to obtain a mixed receive signal;
a sampler that samples said mixed receive signal to obtain receive signal samples from a period of said receive signal; and
a processor that processes said receive signal samples by defining a measurement matrix assuming the receive signal were received in response to a frequency modulated transmit signal having an assumed bandwidth that is higher than said actual transmit bandwidth, said assumed bandwidth corresponding to a desired range resolution, and that determines the positions of one or more targets of the scene by applying compressive sensing using said measurement matrix and said receive signal samples.

2. The radar apparatus as claimed in claim 1,
wherein said processor is configured to define said measurement matrix having a number of rows corresponding to the number of receive signal samples from a period of said receive signal, wherein the elements of each row have a value that depends on the same frequency component of said receive signal, and having a number of columns corresponding to a defined range grid that matches the desired range resolution.

3. The radar apparatus as claimed in claim 1,
wherein said processor is configured to apply a l1-norm minimization algorithm for solving a l1-regularization problem existing when applying compressive sensing.

4. The radar apparatus as claimed in claim 3,
wherein said processor is configured to solve said l1-norm minimization problem by applying a second order cone solver.

5. The radar apparatus as claimed in claim 1,
wherein said processor is configured to apply a l1-norm minimization algorithm for solving a l1-regularization problem.

6. The radar apparatus as claimed in claim 1,
wherein said processor is configured to apply a l1-norm minimization algorithm for solving a Dantzing selector regularization problem.

7. The radar apparatus as claimed in claim 6,
wherein said processor is configured to iteratively adjust a value of a regularization parameter in the Dantzing selector problem, solve the l1-regularization problem with the adjusted regularization value and update the values of detected targets until an end criterion is fulfilled.

8. The radar apparatus as claimed in claim 7,
wherein said processor is configured to iteratively adjust said regularization value by decreasing it with increasing iteration number.

9. The radar apparatus as claimed in claim 7 or 8,
wherein said processor is configured to iteratively normalize, weight and accumulate estimated values for a reflectivity vector after the l1-regularization problem is solved and before the end criterion is checked.

10. The radar apparatus as claimed in claim 9,
wherein said processor is configured to give more penalty to estimated target values obtained with a higher value of the regularization parameter.

11. The radar apparatus as claimed in claim 1, further comprising
a Fast Fourier Transformer (FFT) that performs a FFT on the mixed receive signal to obtain an FFT receive signal; and
a selector that selects regions of the scene in which potential targets are located by analyzing said FFT values of the receive signal,
wherein said processor is configured to process said receive signal samples and define a measurement matrix on a grid having a higher range resolution than the theoretical range resolution only for the selected regions and to determine the positions of one or more targets by applying compressive only within the selected regions of the scene.

12. The radar apparatus as claimed in claim 1,
comprising a co-located antenna representing said transmitter antenna and said receiver antenna which is alternately used for transmitting and receiving.

13. A radar method comprising the steps of:
transmitting a frequency modulated transmit signal having a transmit bandwidth towards a scene potentially comprising two or more targets;
receiving a receive signal reflected from said scene in response to the transmission of said transmit signal;
mixing said receive signal with said transmit signal to obtain a mixed receive signal;
sampling said mixed receive signal to obtain receive signal samples from a period of said receive signal; and
processing said receive signal samples by defining a measurement matrix assuming the receive signal were received in response to a frequency modulated transmit signal having an assumed bandwidth that is higher than said actual transmit bandwidth, said assumed bandwidth corresponding to a desired range resolution, and by determining the positions of one or more targets of the scene by applying compressive sensing using said measurement matrix and said receive signal samples.

14. A processor for use in a radar apparatus having a transmitter antenna that transmits a frequency modulated transmit signal having a transmit bandwidth towards a scene potentially comprising two or more targets, a receiver antenna that receives a receive signal reflected from said scene in response to the transmission of said transmit signal, a mixer that mixes said receive signal with said transmit signal to obtain a mixed receive signal, and a sampler unit that samples said mixed receive signal to obtain receive signal samples from a period of said receive signal, wherein said processor is configured to:
process said receive signal samples by defining a measurement matrix assuming the receive signal were received in response to a frequency modulated transmit signal having an assumed bandwidth that is higher than said actual transmit bandwidth, said assumed bandwidth corresponding to a desired range resolution, and to determine the positions of one or more targets of the scene by applying compressive sensing using said measurement matrix and said receive signal samples.

15. A processing method for use in a radar method comprising the steps of transmitting a frequency modulated transmit signal having a transmit bandwidth towards a scene potentially comprising two or more targets, receiving a receive signal reflected from said scene in response to the transmission of said transmit signal, mixing said receive signal with said transmit signal to obtain a mixed receive signal, and sampling said mixed receive signal to obtain receive signal samples from a period of said receive signal, said processing method comprising:
processing said receive signal samples by defining a measurement matrix assuming the receive signal were received in response to a frequency modulated transmit signal having an assumed bandwidth that is higher than said actual transmit bandwidth, said assumed bandwidth corresponding to a desired range resolution, and by determining the positions of one or more targets of the scene by applying compressive sensing using said measurement matrix and said receive signal samples.

16. A computer readable non-transitory medium having instructions stored thereon which, when carried out on a computer, cause the computer to perform the steps of the processing method as claimed in claim 15.

* * * * *